United States Patent [19]

Thorp et al.

[11] 4,037,862

[45] July 26, 1977

[54] FLEXIBLE DUCTING JOINTS

[75] Inventors: Peter Thorp, Hampton; George William Bycroft, Doncaster, both of England

[73] Assignee: Coal Industry (Patents) Limited, London, England

[21] Appl. No.: 621,373

[22] Filed: Oct. 10, 1975

[30] Foreign Application Priority Data

Nov. 7, 1974 United Kingdom ............... 48212/74

[51] Int. Cl.² ............................................. F16L 31/00
[52] U.S. Cl. .................................................. 285/260
[58] Field of Search ....................... 285/260, 374, 423; 248/188, 188.5, 188.8; 2/270

[56] References Cited

U.S. PATENT DOCUMENTS

| 1,274,438 | 8/1918 | Nettleton | 285/260 |
| 1,525,538 | 2/1925 | Evans | 285/260 |
| 2,911,237 | 11/1959 | Olson | 285/260 |

FOREIGN PATENT DOCUMENTS

| 704,629 | 3/1941 | Germany | 285/260 |
| 1,366,982 | 9/1974 | United Kingdom | 285/260 |

Primary Examiner—Werner H. Schroeder
Assistant Examiner—Moshe I. Cohen
Attorney, Agent, or Firm—James C. Wray

[57] ABSTRACT

A joint is made between the ends of two similar lengths of flexible ducting. One end has a single ring and the other a pair of parallel rings. The single ring fits between the pair of rings. Either the single ring or the extreme ring of the pair of rings is of a larger diameter than the diameter of the ducting. The end of the ducting length with the larger ring is fitted inside the other ducting length.

5 Claims, 4 Drawing Figures

FLEXIBLE DUCTING JOINTS

This invention relates to flexible ducting joints and to lengths of ducting for use in such joints.

In our U.S. Patent Application No. 320,552 we have explained that flexible ducting is used in many mines for ventilation purposes and usually comprises a cloth tube which is supplied in lengths and joined between the lengths. Air is blown or drawn through the ducting to the required positions. In order for the ventilation to be efficient it is necessary that the ducting is substantially leak-proof and that the joints are effective. The ducting itself is made from a fabric material such as nylon or terylene which is coated with a plastics material such as p.v.c. In certain cases the coating may also include anti-static materials.

We have also referred to a form of jointing which uses two interlocking rings. At the end of each length of ducting the cuff has a flexible ring stitched in it. To make the joint, the ring at the end of one length of ducting is bent so as to pass through an identical ring attached to an adjacent length of ducting. The first ring is then pulled back until it abuts behind the ring on the adjacent length. This type of joint is cheap but has the serious disadvantage of not being a sufficiently positive joint for all uses as it can, on occasions, separate under pressure or strain. Furthermore, there is a grave risk that when the pressure within the ducting falls and the ducting collapses the joints may come apart if one ring falls back inside the ducting since it may pull out of the ducting when ventilation is re-started.

We have also referred to an alternative form of joint in which a draw-string or the like is used to pull one end of the ducting tight round an adjacent end which is inserted into the first end. These alternative forms suffer from the disadvantages that since there are many pieces which are not intergral parts of the ducting they may become damaged or lost. Furthermore, the drawstrings have been known to break and if the strings are pulled too tightly they throttle the joint to reduce the size of the ducting at the joint. Furthermore if the string is not secured sufficiently tightly or stretches the joint will be liable to separate.

In order to overcome these disadvantages we have disclosed and claimed in U.S. Pat. No. 320,552 a flexible ducting joint which includes a first length of flexible ducting which has a substantially parallel pair of rings secured to it at one of its ends, the first of said rings being of a smaller diameter than the said second ring and is attached at the extreme end of the ducting and the second of said rings being attached at a predetermined distance from said extreme end, and a second length of flexible ducting having an elastically deformable ring secured to its end, the said predetermined distance being such as to retain between the rings of the first length the ring of the second length where said ring is inserted into the end of the first length.

According to the present invention a flexible ducting joint includes a first length of flexible ducting have a first ring secured to its end and a second ring secured to the ducting substantially parallel to the first ring and spaced a predetermined distance from it, and a second length of ducting having a third ring secured to its end, the two lengths of ducting being of the same diameter, wherein either the said first and third ring, is flexibly deformable and is of a diameter greater than the diameter of the ducting and the said second ring and respectively, either the third or first rings, have a diameter substantially equivalent to that of the ducting, the ductings being fitted together with the end of the ducting have the ring of larger diameter inserted inside the other ducting so that the said ring of larger diameter lies behind the other ring at the end of a length of ducting and so that the said third ring lies between the said first and second rings.

The ducting will normally be of a circular cross-section and the rings will be of a corresponding shape. If the ducting is other than circular in cross-section and the rings have a corresponding non-circular shape the word 'diameter' as used herein is to be construed as relating to the dimensions of that shape.

The rings may be secured to the ducting by stitching or bonding or may be secured in pockets attached to the ducting. The rings may be made from a resilient material such as a plastics material or wire rope which when formed into a ring enables the ring to be elastically deformable.

The invention also includes a length of ducting having a ring secured to its end of a diameter larger than the diameter of the ducting. A second ring may be secured to the ducting and spaced from this larger diameter ring by the said predetermined distance and this second ring will have a diameter substantially equivalent to that of the ducting.

In order that the invention may be readily understood two embodiments of a flexible ducting joint in accordance with the invention will now be described by way of example only with reference to the accompanying drawings. In the drawing FIG. 1 shows a side view of two lengths of flexible ducting prior to a joint being made and FIG. 2 shows the length joined together to make the joint of the first embodiment.

Figure 1:
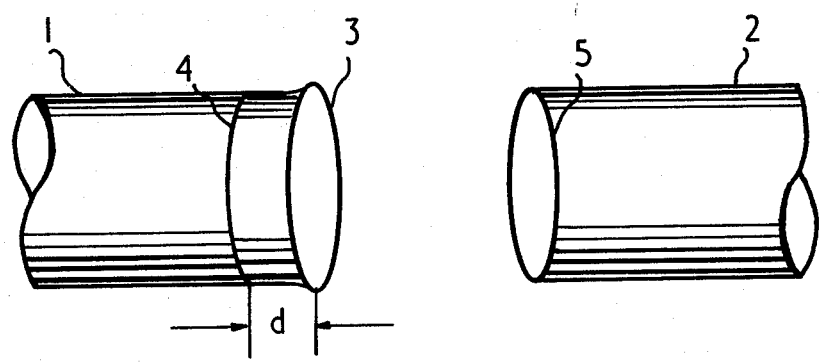
Figure 2:
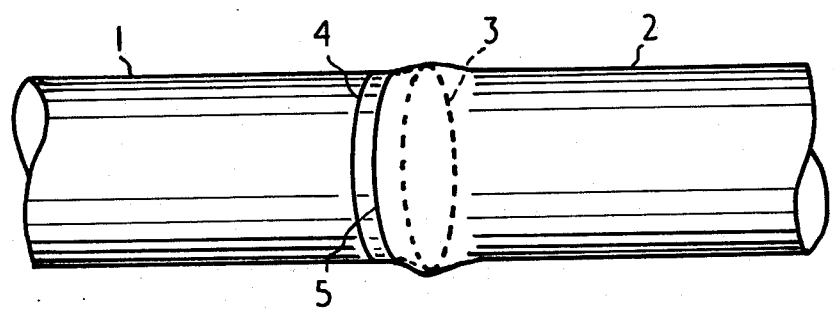

Referring first to FIGS. 1 and 2, the ends of two lengths, 1, 2 of flexible ducting to be joined are shown separated. The ducting is to be used as a ventilation ducting and is made from a p.v.c. coated nylon.

The length 1 has a ring 3 of wire rope stitched to its end. This ring 3 is of a larger diameter than the diameter of the ducting 1. In this example the ducting 1 has an internal diameter of 12 inches and the ring 3 an internal diameter of 12½ inches. A second ring 4 has an internal diameter of 12 inches. The second length 2 has a single ring 5 of wire rope of internal diameter 12 inches stitched in a cuff at its end.

The joint is formed by inserting the end of the length 1 into the end of the length 2. To do this the ring 3 is deformed and pushed through ring 5 so that ring 5 lies between rings 4 and 3. Ring 3 is released and, because of its elastic nature, springs out behind ring 5 extending and stretching the material of ducting 2 in the area of the cuff. The result is that ring 5 is now trapped between rings 4 and 3 and cannot move. If axial stress is applied to pull against the joint as occurs with the joint under pressure from gas flowing in the ducting then ring 5 pulls back against ring 3 and since the ring 3 is of a larger diameter than ring 5 the joint will not open. The higher the pressure within the ducting the higher will be the effectiveness of the joint against leakage.

Rings 3 and 4 are parallel and are separated along ducting length 1 by a distance d. This distance is selected so that even with no gas pressure in the ducting and the ducting collapsed ring 5 will remain trapped between rings 3 and 4 and the joint will not open.

Figure 3:
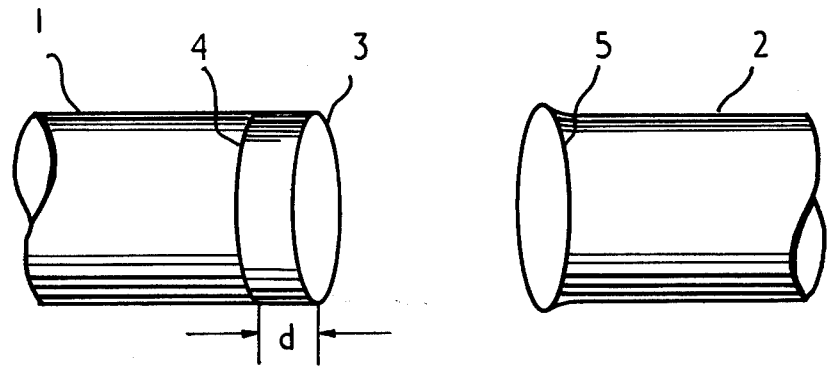
FIG. 3 shows two different lengths of ducting in a separated condition.
Figure 4:
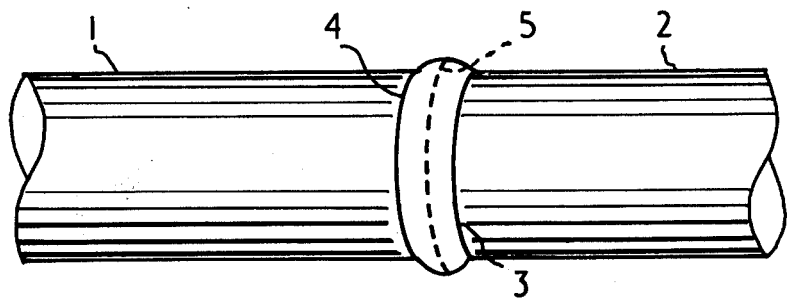
FIG. 4 shows them put together to form the joint of the second embodiment.

Referring now to FIGS. 3 and 4, here the parallel rings 3 and 4 are of the same internal diameter as the length of ducting 1, i.e. 12 inches. The ring 5, however, is larger and has a diameter of 12½ inches. The end of the ducting 2, which is also 12 inches in internal diameter, is stretched to be attached to the ring.

To make the joint the ring 5 is deformed and slipped into the end of ducting length 1. It is then released and elastically reverts to its formed shape. It is positioned between rings 3 and 4 and expands the material between these rings. As in the first embodiment high pressure in the ducting prevents the joint opening by pressing ring 5 against ring 3, and with no pressure the spacing $d$ of rings 3 and 4 does not permit ring 5 to pass either ring and fall into the ducting to open the joint.

We claim:

1. A joint between two lengths of a flexible ducting in which an end of a first one of the said lengths is provided with a single ring secured to its extreme end, and the end of a second one of the said lengths is provided with a pair of parallel rings one of which is secured to an extreme end of the length and the other of which is spaced from said one ring by a predetermined distance, one of the rings secured to the extreme ends of the lengths being elastically deformable and having a diameter greater than the diameter of the ducting and the other rings having diameters equivalent to the diameter of the ducting, the elastically deformable ring being inserted into the adjacent length of ducting to a position where the said single ring lies between the said pair of parallel rings, the elastically deformable ring thereby extending material of the adjacent length of ducting in the area of the elastically deformable ring to a greater size than the remainder of the ducting.

2. A joint according to the claim 1 in which the single ring is the ring of greater diameter.

3. A joint according to claim 1 in which the ring of the pair of parallel rings which is secured to the said extreme end is the ring of greater diameter.

4. A joint according to claim 1 in which the material of the ducting is stretched in the area of the ring of greater diameter.

5. A joint according to claim 1 in which the said predetermined distance is selected so as to retain the single ring between the pair of parallel rings when the ducting is not in tension.

* * * * *